US012739497B2

(12) United States Patent
Yamamoto et al.

(10) Patent No.: US 12,739,497 B2

(45) Date of Patent: Sep. 15, 2026

(54) INFORMATION PROCESSING WITH ALIGNMENT OF IMAGES CAPTURED BY RESPECTIVE LENSES

(71) Applicant: Sony Group Corporation, Tokyo (JP)

(72) Inventors: Kouji Yamamoto, Kanagawa (JP); Kazuya Sento, Kanagawa (JP); Hiroki Takahara, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 97 days.

(21) Appl. No.: 18/796,893

(22) Filed: Aug. 7, 2024

(65) Prior Publication Data

US 2025/0024137 A1 Jan. 16, 2025

Related U.S. Application Data

(63) Continuation of application No. 17/801,422, filed as application No. PCT/JP2021/006147 on Feb. 18, 2021, now Pat. No. 12,081,863.

(30) Foreign Application Priority Data

Mar. 19, 2020 (JP) ................................ 2020-050031

(51) Int. Cl.

| | |
|---|---|
| ***H04N 23/60*** | (2023.01) |
| ***G06T 7/30*** | (2017.01) |
| ***G06T 7/55*** | (2017.01) |
| ***H04N 13/25*** | (2018.01) |
| ***H04N 23/67*** | (2023.01) |

(Continued)

(52) U.S. Cl.

CPC ............... *H04N 23/64* (2023.01); *G06T 7/30* (2017.01); *G06T 7/55* (2017.01); *H04N 13/25* (2018.05); *H04N 23/675* (2023.01); *H04N 23/90* (2023.01); *H04N 23/951* (2023.01)

(58) Field of Classification Search

None

See application file for complete search history.

(56) References Cited

U.S. PATENT DOCUMENTS 10,200,671 B2 * 2/2019 Dahi ................. H04N 23/6811
2002/0075258 A1 6/2002 Park (Continued)

FOREIGN PATENT DOCUMENTS

CN 105791801 A 7/2016
CN 110602350 A 12/2019

(Continued)

OTHER PUBLICATIONS

International Search Report (PCT/ISA/210), International Application No. PCT/JP2021/006147, dated May 11, 2021.

*Primary Examiner* — Quan Pham

(74) *Attorney, Agent, or Firm* — Michael Best & Friedrich LLP

(57) ABSTRACT

An information processing apparatus (10) includes: a deciding unit configured to decide alignment information to be used for alignment between a first image captured by a first imaging device and a second image captured by a second imaging device having an angle of view wider than an angle of view of the first imaging device, on the basis of imaging-related information related to imaging performed by the first imaging device; and an outputting unit configured to output the alignment information.

19 Claims, 7 Drawing Sheets

(51) Int. Cl.

| | |
|---|---|
| ***H04N 23/90*** | (2023.01) |
| ***H04N 23/951*** | (2023.01) |

(56) References Cited

U.S. PATENT DOCUMENTS

| | | | | |
|---|---|---|---|---|
| 2008/0084484 | A1* | 4/2008 | Ochi .................... | H04N 23/635<br>348/222.1 |
| 2015/0271414 | A1 | 9/2015 | Sato | |
| 2018/0160046 | A1 | 6/2018 | Nash | |
| 2019/0009604 | A1 | 1/2019 | Hachmann et al. | |
| 2019/0096047 | A1 | 3/2019 | Ogasawara | |

FOREIGN PATENT DOCUMENTS

| | | | |
|---|---|---|---|
| JP | 2017220885 | A | 12/2017 |
| JP | 2018011302 | A | 1/2018 |
| JP | 2019068117 | A | 4/2019 |
| JP | 2020009099 | A | 1/2020 |
| WO | WO-2019003751 | A1 | 1/2019 |

* cited by examiner

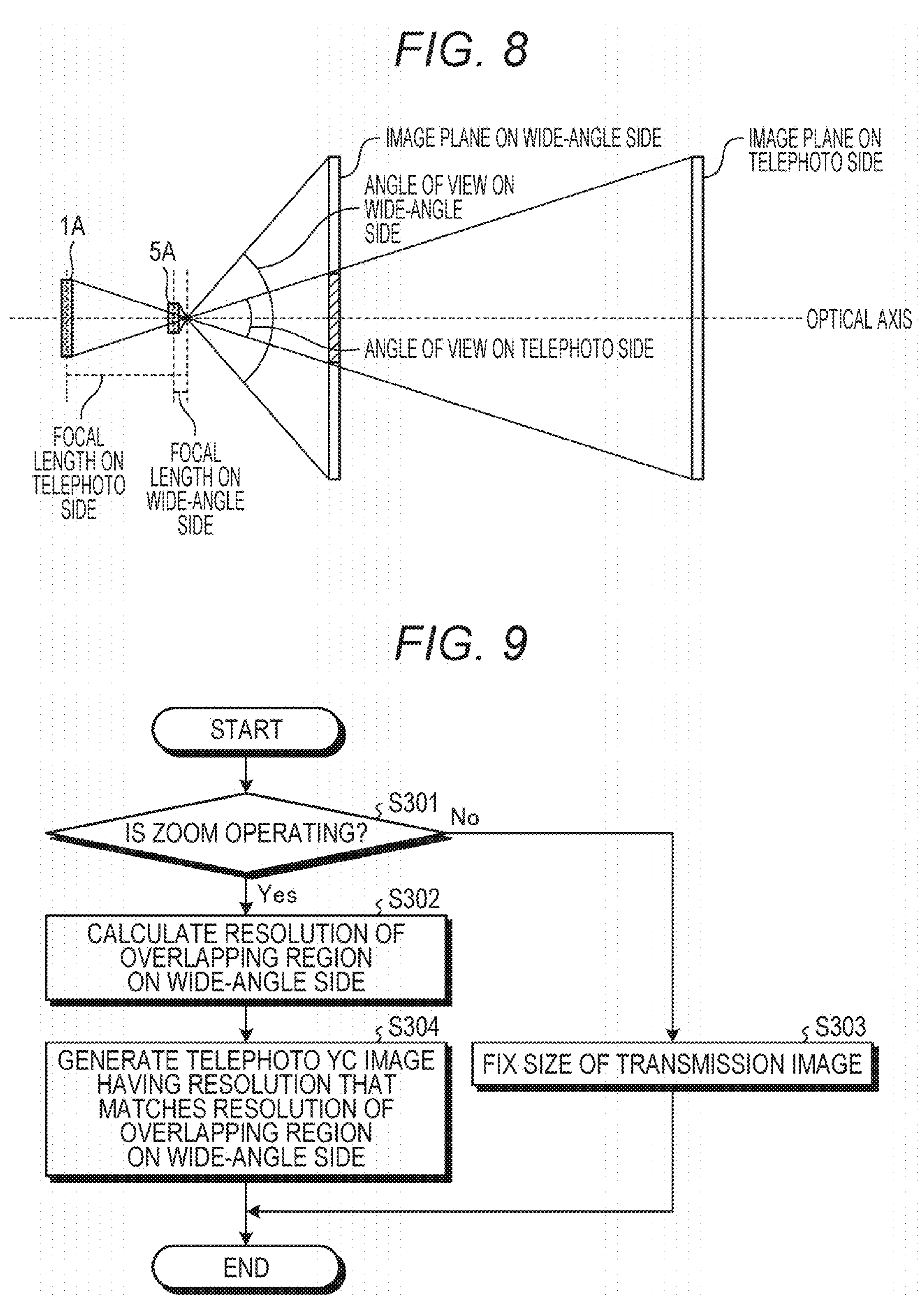
FIG. 8
IMAGE PLANE ON WIDE-ANGLE SIDE
IMAGE PLANE ON TELEPHOTO SIDE
ANGLE OF VIEW ON WIDE-ANGLE SIDE
1A
5A
OPTICAL AXIS
ANGLE OF VIEW ON TELEPHOTO SIDE
FOCAL LENGTH ON TELEPHOTO SIDE
FOCAL LENGTH ON WIDE-ANGLE SIDE
FIG. 9
START
S301
IS ZOOM OPERATING?
No
Yes
S302
CALCULATE RESOLUTION OF OVERLAPPING REGION ON WIDE-ANGLE SIDE
S304
GENERATE TELEPHOTO YC IMAGE HAVING RESOLUTION THAT MATCHES RESOLUTION OF OVERLAPPING REGION ON WIDE-ANGLE SIDE
S303
FIX SIZE OF TRANSMISSION IMAGE
END

INFORMATION PROCESSING WITH ALIGNMENT OF IMAGES CAPTURED BY RESPECTIVE LENSES

CROSS REFERENCE TO RELATED APPLICATIONS

This application is a Continuation of application Ser. No. 17/801,422, filed Aug. 22, 2022, which is a National Stage Application of PCT/JP2021/006147, filed Feb. 18, 2021, and claims the benefit of Japanese Priority Patent Application JP 2020-050031 filed Mar. 19, 2020, the entire contents of which are incorporated herein by reference.

TECHNICAL FIELD

The present invention relates to an information processing apparatus, an information processing method, and an information processing program.

BACKGROUND ART

When capturing images with cameras, as an example, various finders such as an optical finder and an electronic viewfinder are used to check composition.

CITATION LIST

Patent Document

Patent Document 1: Japanese Patent Application Laid-Open No. 2018-11302

SUMMARY OF THE INVENTION

Problems to be Solved by the Invention

However, with the finder described above, trial and error in which a line-of-sight is alternately moved between the inside and the outside of the finder occurs until composition as intended by a photographer fits within the frame of the camera, so that framing work becomes complicated.

Therefore, an object of the present disclosure is to provide an information processing apparatus, an information processing method, and an information processing program capable of simplifying framing work.

Solutions to Problems

In order to solve the problem described above, an information processing apparatus according to an embodiment of the present disclosure includes: a deciding unit configured to decide alignment information to be used for alignment between a first image captured by a first imaging device and a second image captured by a second imaging device having an angle of view wider than an angle of view of the first imaging device, on the basis of imaging-related information related to imaging performed by the first imaging device; and an outputting unit configured to output the alignment information.

BRIEF DESCRIPTION OF DRAWINGS

FIG. 8 is a diagram illustrating an example of a correspondence relationship between a focal length and an angle of view.

FIG. 9 is a flowchart illustrating a procedure of information output processing according to the third embodiment.

MODE FOR CARRYING OUT THE INVENTION

Hereinafter, embodiments of the present disclosure will be described in detail on the basis of the drawings. Note that in each of the following embodiments, the same parts are denoted by the same reference signs, and redundant description will be omitted.

Furthermore, the present disclosure will be described according to the following item order.

1. First Embodiment
 1-1. Example of System Configuration
 1-2. Examples of Use Cases
 1-3. Functional Configuration Example of First Imaging Device
 1-3-1. Imaging Sensor
 1-3-2. Digital Signal Processing Unit
 1-3-3. Displaying Unit
 1-4. Functional Configuration Example of Second Imaging Device
 1-4-1. Imaging Sensor
 1-4-2. Digital Signal Processing Unit
 1-4-3. Aligning Unit
 1-4-4. Displaying Unit
 1-5. One Aspect of Problem
 1-6. One Aspect of Approach to Solving Problem
 1-7. Functional Configuration Example of Information Processing Apparatus
 1-7-1. Acquiring Unit
 1-7-2. Deciding Unit
 1-7-3. Outputting Unit
 1-8. Processing Procedure of Information Processing Apparatus
 1-9. One Aspect of Effects
2. Second Embodiment
 2-1. Functional Configuration Example of Information Processing Apparatus
 2-2. Deciding Unit
 2-2-1. Determining Unit
 2-2-2. Selecting Unit
 2-3. Processing Procedure of Information Processing Apparatus
 2-4. One Aspect of Effects 3. Third Embodiment
3-1. Functional Configuration Example of Information Processing Apparatus
3-2. Deciding Unit
3-2-1. Calculating Unit
3-2-2. Generating Unit
3-3. Processing Procedure of Information Processing Apparatus
3-4. One Aspect of Effects
4. Modifications
4-1. Combinations between Embodiments
4-2. Execution Subject of Alignment
4-3. Other Modifications
5. Hardware Configuration

1. First Embodiment

<1-1. Example of System Configuration>

Figure 1:
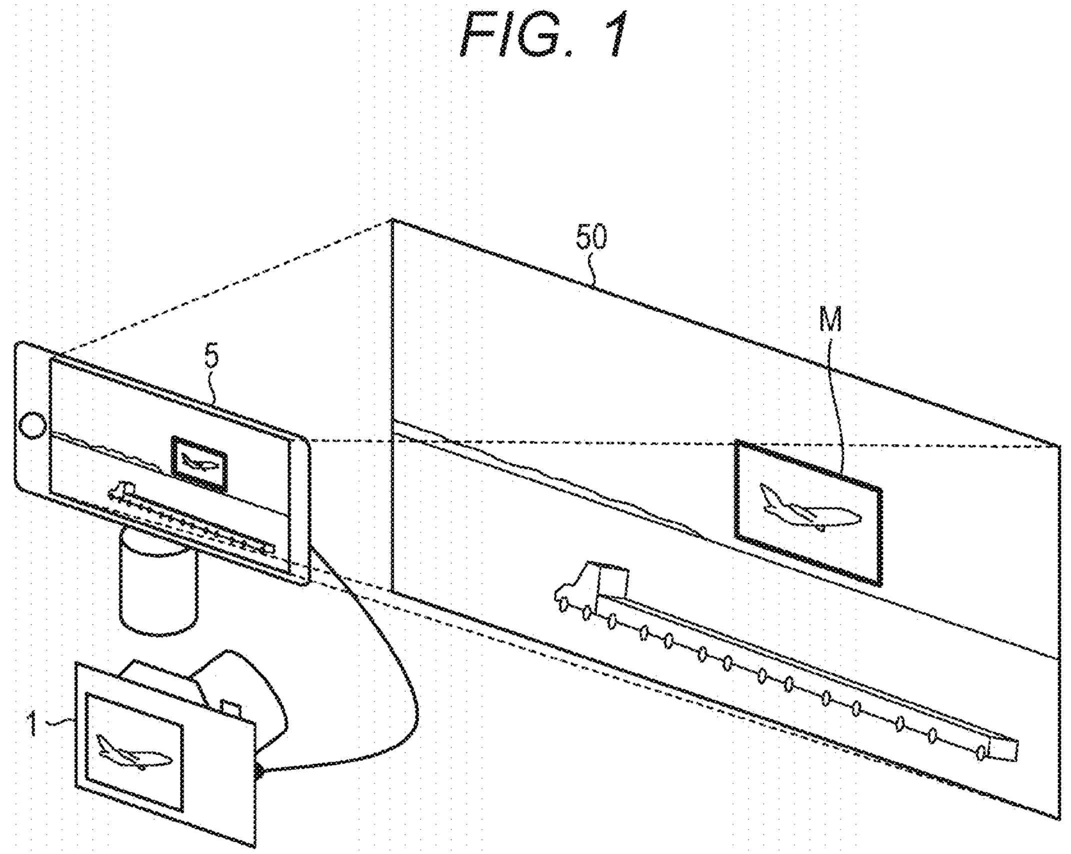
FIG. 1 is a diagram illustrating a configuration example of a system according to a first embodiment.

FIG. 1 is a diagram illustrating a configuration example of a system according to a first embodiment. The system illustrated in FIG. 1 provides an imaging support function of displaying a mark M indicating a position of a frame in which a first imaging device 1 captures an image on an image 50 captured by a second imaging device 5 from an aspect of simplifying framing work.

As shown in FIG. 1, the system may include the first imaging device 1 and the second imaging device 5. The first imaging device 1 and the second imaging device 5 are communicably connected. As a mere example, the first imaging device 1 and the second imaging device 5 can be connected via a universal serial bus (USB) cable or the like. Furthermore, bidirectional communication does not necessarily need to be performed between the first imaging device 1 and the second imaging device 5, and the first imaging device 1 and the second imaging device 5 may be connected via a high-definition multimedia interface (HDMI) (registered trademark) cable or the like.

As one aspect, the first imaging device 1 and the second imaging device 5 do not necessarily need to have the same angle of view. For example, while a telephoto lens having a longer focal length than a focal length of a lens used for imaging by the second imaging device 5 can be mounted on the first imaging device 1, a wide-angle lens having a wider angle of view than an angle of view of a lens used for imaging by the first imaging device 1 can be mounted on the second imaging device 5.

As another aspect, the optical axes of the first imaging device 1 and the second imaging device 5 may coincide with each other, or the optical axes of the first imaging device 1 and the second imaging device 5 do not necessarily need to coincide with each other. Note that in FIG. 1, as a mere example, the first imaging device 1 and the second imaging device 5 are illustrated as different device groups, but the first imaging device 1 and the second imaging device 5 may be integrated into two devices.

Note that FIG. 1 illustrates an example in which the first imaging device 1 and the second imaging device 5 are connected by wire, but the configuration is not limited to the example, and the first imaging device 1 and the second imaging device 5 can be connected by near field wireless communication or wireless communication.

<1-2. Example of Use Cases>

The first imaging device 1 and the second imaging device 5 do not necessarily need to be electronic devices dedicated for imaging. For example, it is not precluded that the first imaging device 1 and the second imaging device 5 are provided with other functions other than an imaging function.

As a mere example, there is a use case in which a mark M indicating a position of a frame captured by a digital camera is superimposed and displayed on an image 50 captured by a smartphone or a tablet terminal. In this case, the first imaging device 1 can be implemented as a digital camera, and the second device 5 can be implemented as a smartphone, a tablet terminal, or the like.

As another example, there is a use case in which a mark M indicating a position of a frame captured by a digital camera such as an interchangeable lens camera with a stabilizer is superimposed and displayed on an image 50 captured by a pair of augmented reality (AR) glasses. In this case, the first imaging device 1 can be implemented as a digital camera, and the second imaging device 5 can be implemented as AR glasses.

Note that in FIG. 1, as a mere example, a mark M of the frame itself on which the first imaging device 1 captures an image is illustrated, but the shape and size of the mark M may be any. For example, the mark M may be a pointer, a figure, a symbol, or the like indicating a position of the frame in which the first imaging device 1 captures an image.

<1-3. Functional Configuration Example of First Imaging Device>

Figure 2:
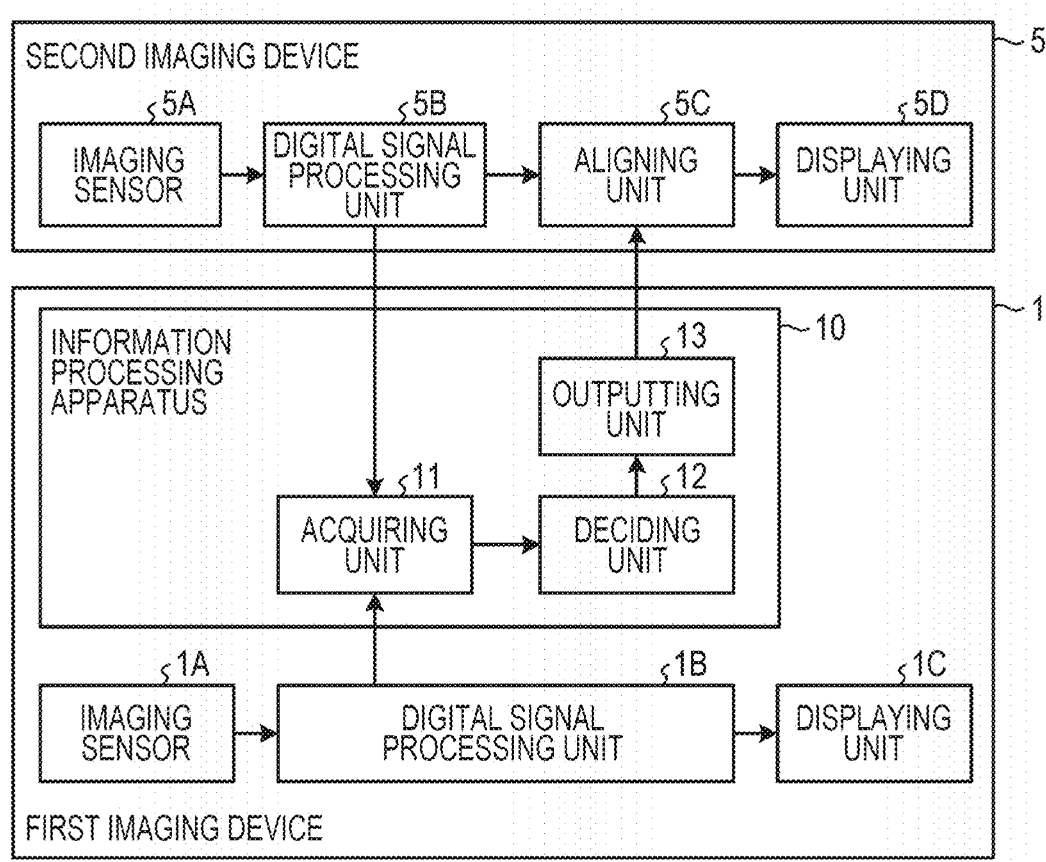
FIG. 2 is a block diagram illustrating a functional configuration example of an information processing apparatus according to the first embodiment.

FIG. 2 is a block diagram illustrating a functional configuration example of an information processing apparatus 10 according to the first embodiment. As illustrated in FIG. 2, the first imaging device 1 includes an imaging sensor 1A, a digital signal processing unit 1B, a displaying unit 1C, and the information processing apparatus 10.

Here, although FIG. 2 illustrates an example in which the information processing apparatus 10 is incorporated in the first imaging device 1, this is a mere example. For example, the information processing apparatus 10 may be incorporated in the second imaging device 5 or may be implemented as a third apparatus different from the first imaging device 1 and the second imaging device 5. Note that the information processing apparatus 10 will be described after functional configuration examples of the first imaging device 1 and the second imaging device 5 are described.

<1-3-1. Imaging Sensor 1A>

As the imaging sensor 1A, an image sensor such as a charge coupled device (CCD) or a complementary metal oxide semiconductor (CMOS) image sensor o can be adopted. As a mere example, light condensed through an optical system of the first imaging device 1, for example, the telephoto lens is photoelectrically converted by the imaging sensor 1A. A RAW image obtained by such photoelectric conversion is input to the digital signal processing unit 1B.

Here, an image plane phase difference sensor (not illustrated) can be incorporated in the imaging sensor 1A. For example, a distance to a subject, that is, a depth can be measured from a phase difference signal output from the image plane phase difference sensor. In this manner, the depth measured for each image plane phase difference sensor can be output to the digital signal processing unit 1B as a depth map.

Note that although the image plane phase difference sensor has been exemplified here, a phase difference sensor may be mounted on the first imaging device 1 instead of the image plane phase difference sensor, or both the image plane phase difference sensor and the phase difference sensor may be mounted. Furthermore, here, the image plane phase difference sensor and the phase difference sensor have been exemplified, but it is not precluded that a depth sensor other than the image plane phase difference sensor and the phase difference sensor is provided in the first imaging device 1.

<1-3-2 Digital Signal Processing Unit 1B>

The digital signal processing unit 1B is a functional unit that executes digital signal processing. As an embodiment, the digital signal processing unit 1B can be achieved by hardware such as a digital signal processor (DSP). For example, examples of the digital signal processing described above include processing of converting a RAW image into an image in a predetermined format, for example, a YC image, processing such as so-called RAW development, white balance adjustment, color difference correction, and the like.

Note that here, an example in which the digital signal processing unit 1B described above is achieved by hardware has been described, but the digital signal processing unit 1B may be achieved by software of a RAW development engine or the like being executed by a processor.

<1-3-3. Displaying Unit 1C>

The displaying unit 1C is a functional unit that displays various types of information. As an embodiment, the displaying unit 1C can be implemented by disposing a liquid crystal display, an organic electroluminescence (EL) display, or the like on the back surface of a housing of the first imaging device 1. For example, the displaying unit 1C displays a YC image in real time every time the YC image is output by the digital signal processing unit 1B. Hereinafter, from the aspect of distinguishing a label of the YC image output by the digital signal processing unit 1B from a label of a YC image output by the digital signal processing unit 5B as described later, the former may be referred to as a "telephoto YC image" and the latter may be referred to as a "wide-angle YC image". As a result, a live view function of the telephoto YC image can be achieved.

Note that the displaying unit 1C can also be implemented as a touch panel by being integrated with an inputting unit (not illustrated). Furthermore, as described above, since there is an aspect that the mark indicating the position of a frame in which the first imaging device 1 captures an image is displayed on a displaying unit 5D of the second imaging device 5, the displaying unit 1C does not necessarily need to be provided in the first imaging device 1.

<1-4. Functional Configuration Example of Second Imaging Device 5>

As illustrated in FIG. 2, the second imaging device 5 includes an imaging sensor 5A, the digital signal processing unit 5B, an aligning unit 5C, and the displaying unit 5D.

<1-4-1. Imaging Sensor 5A>

As the imaging sensor 5A, an image sensor such as a CCD or a CMOS can be adopted. As a mere example, light condensed through an optical system of the second imaging device 5, for example, the telephoto lens is photoelectrically converted by the imaging sensor 5A. A RAW image obtained by such photoelectric conversion is input to the digital signal processing unit 5B.

Also in such an imaging sensor 5A, similarly to the imaging sensor 1A described above, an image plane phase difference sensor (not illustrated) can be incorporated. In this manner, the depth measured for each image plane phase difference sensor can be output to the digital signal processing unit 5B as a depth map. Note that although the image plane phase difference sensor has been exemplified here, a phase difference sensor may be mounted on the second imaging device 5 instead of the image plane phase difference sensor, or both the image plane phase difference sensor and the phase difference sensor may be mounted. Furthermore, here, the image plane phase difference sensor and the phase difference sensor have been exemplified, but it is not precluded that a depth sensor other than the image plane phase difference sensor and the phase difference sensor is provided in the second imaging device 5.

<1-4-2. Digital Signal Processing Unit 5B>

The digital signal processing unit 5B is a functional unit that executes digital signal processing. As an embodiment, the digital signal processing unit 5B is virtually achieved by a processor such as a central processing unit (CPU) or a micro processing unit (MPU). For example, the processor reads a program of software or the like of a RAW development engine or the like in addition to an operating system (OS) from a storage (not illustrated). Then, the processor executes the RAW development engine described above to develop a process corresponding to the digital signal processing unit 5B on a memory such as a random access memory (RAM). As a result, the digital signal processing unit 5B is virtually achieved as the process. Here, the CPU and the MPU have been exemplified as examples of the processor, but the digital signal processing unit 5B may be achieved by any processor regardless of a general-purpose type and a specialized type. In addition, it is not precluded that the digital signal processing unit 5B is achieved by hard-wired logic such as an application specific integrated circuit (ASIC) or a field programmable gate array (FPGA).

The digital signal processing unit 5B can exhibit a function similar to the function of the digital signal processing unit 1B described above. For example, the digital signal processing unit 5B can execute the processing of converting a RAW image into an image in a predetermined format, for example, a YC image, processing such as so-called RAW development, white balance adjustment, color difference correction, and the like, as examples of digital signal processing described above.

Note that here, there has been described an example in which the digital signal processing unit 5B is archived by the software of the RAW development engine or the like being executed by the processor, but the digital signal processing unit 1B described above may be achieved by hardware.

<1-4-3. Aligning Unit 5C>

The aligning unit 5C is a processing unit that aligns an image captured by the first imaging device 1 and an image captured by the second imaging device 5. As an embodiment, similarly to the digital signal processing unit 5B, the aligning unit 5C can be virtually achieved by a processor such as a CPU or an MPU. For example, the processor reads an image processing program for aligning a plurality of images. Then, the processor executes the image processing program described above to develop a process corresponding to the aligning unit 5C on a memory such as a RAM. As a result, the aligning unit 5C is virtually achieved as the process.

Here, the alignment described above refers to general registration in which a transformation matrix such as movement, rotation or deformation is applied to one image between two images, whereby the one image is aligned to the other image. As one aspect, in the registration, a transformation matrix that maximizes similarity between the two images is searched. For example, as the similarity, a sum of squared difference (SSD), a sum of absolute difference (SAD), a correlation coefficient, or the like can be used. Furthermore, when the transformation matrix is applied, feature points can be matched between the two images.

Such registration achieves alignment between the image captured by the first imaging device 1, for example, the telephoto YC image output by the digital signal processing unit 1B and the image captured by the second imaging device 5, for example, the wide-angle YC image output by the digital signal processing unit 5B. Moreover, here, as a mere example, there will be described an example in which a transformation matrix for aligning the telephoto YC image to the wide-angle YC image is obtained by the registration described above.

As a mere example, the aligning unit 5C can superimpose the telephoto YC image on the wide-angle YC image. At this time, if the optical axes of the first imaging device 1 and the second imaging device 5 are the same, the frame of the telephoto YC image obtained by alignment remains in a rectangular shape as in the example illustrated in FIG. 1. However, in a case where the optical axes are not the same, there is a possibility that the frame of the telephoto YC image obtained by the alignment does not have a rectangular shape, but has a distorted shape.

From such an aspect, the aligning unit 5C can superimpose a mark M indicating the position of the frame of the telephoto YC image, for example, the center position on the wide-angle YC image. Hereinafter, the wide-angle YC image on which the mark M of the position of the frame of the telephoto YC image is superimposed may be referred to as a "wide-angle image with the telephoto frame mark". The wide-angle image with the telephoto frame mark obtained in this manner is output to the displaying unit 5D.

<1-4-4. Displaying Unit 5D>

The displaying unit 5D is a functional unit that displays various types of information. As an embodiment, the displaying unit 5D can be implemented by a liquid crystal display, an organic EL display, or the like, and can also be implemented as a touch panel by being integrated with an inputting unit (not illustrated). For example, the displaying unit 5D displays the wide-angle image with the telephoto frame mark in real time every time the wide-angle image with the telephoto frame mark is output from the aligning unit 5C.

<1-5. One Aspect of Problem>

In embodiment 1 of the present disclosure, the wide-angle image with the telephoto frame mark is displayed on the displaying unit 5D as the imaging support function described above. With such a display, the mark M of the position of the frame of the telephoto YC image can be overlooked on the wide-angle YC image. Therefore, there is an aspect that trial and error in a line-of-sight is moved alternately between the inside and the outside of the finder can be made unnecessary and as a result, the simplification of the framing work can be achieved.

While there is such an aspect, to display the wide-angle image with the telephoto frame mark in real time, image processing such as the alignment of the telephoto YC image and the wide-angle YC image may become a cause of bottleneck and a delay may occur in the display of the position of the frame of the telephoto YC image to be superimposed on the wide-angle YC image. In a case where the delay occurs as described above, there is a difference between the position of the frame of the telephoto YC image on the display and the position of the frame of an actual telephoto YC image, and thus, there is a case where imaging cannot be performed with intended composition.

Various techniques have been proposed for alignment of images, but all of them are techniques for approaching alignment or registration algorithm itself. Such algorithmic ingenuity is merely ingenuity of how to align two images. Therefore, what is used for alignment is only two images, there is no viewpoint that information that can contribute to alignment can be acquired when one of the images is captured, and such algorithmic ingenuity is not used for alignment.

<1-6. One Aspect of Approach to Solving Problem>

Therefore, the information processing apparatus 10 according to the embodiment of the present disclosure provides an information output function that decides and outputs alignment information used for alignment of images between the first imaging device 1 and the second imaging device 5 on the basis of imaging-related information related to imaging performed by the first imaging device 1.

That is, the information processing apparatus 10 according to the embodiment of the present disclosure outputs alignment information that can contribute to a reduction in a processing amount in performing alignment with an image captured by the second imaging device 5 from a viewpoint unique to imaging in the first imaging device 1.

Therefore, in the information processing apparatus 10 according to the embodiment of the present disclosure, since the alignment of the telephoto YC image and the wide-angle YC image can be speeded up, the real-time property of display of the wide-angle image with the telephoto frame mark can be improved.

<1-7. Functional Configuration Example of Information Processing Apparatus 10>

As illustrated in FIG. 2, the information processing apparatus 10 includes an acquiring unit 11, a deciding unit 12, and an outputting unit 13.

<1-7-1. Acquiring Unit 11>

The acquiring unit 11 is a processing unit that acquires imaging-related information related to imaging performed by the first imaging device 1 and the second imaging device 5. Here, the "imaging-related information" is not limited to images themselves captured by the first imaging device 1 and the second imaging device 5, but may include general information related to imaging, as illustrated below. Note that here, there has been described an example in which the imaging-related information of both the first imaging device 1 and the second imaging device 5 is acquired, but the imaging-related information of either one of the first imaging device 1 and the second imaging device 5 can be acquired.

a) Image sizes and imaging sensor sizes of the imaging sensor 1A and the imaging sensor 5A
b) Focal lengths of the first imaging device 1 and the second imaging device 5
c) Parameters for imaging by the first imaging device 1 and the second imaging device 5
d) Information that can be acquired from the telephoto YC image and the wide-angle YC image
e) Information regarding the bandwidth and stability of data transmission between the first imaging device 1 and the second imaging device 5
f) Information regarding the physical positional relationship between the first imaging device 1 and the second imaging device 5 and an amount of optical axis deviation
g) Processing capability of an arithmetic unit mounted on the first imaging device 1 and the second imaging device 5

The imaging-related information of a) to g) described above can be acquired in units of frames in which the first imaging device 1 and the second imaging device 5 capture images. For example, supplementing c) described above, the parameters for imaging described above may include exposure, white balance, a shutter speed, an International Organization for Standardization (ISO) value, an F value, and the like as mere examples. Supplementing d) described above, the information that can be acquired may include information regarding results of object recognition, a depth map, proper exposure, light source information, flicker information, and the like as mere examples.

Such imaging-related information can be acquired from both the first imaging device 1 and the second imaging device 5. For example, the imaging-related information regarding the first imaging device 1 can be acquired from the digital signal processing unit 1B or a driver integrated circuit (IC) that drives the optical system of the first imaging device 1. Furthermore, the imaging-related information regarding the second imaging device 5 can be acquired from the digital signal processing unit 5B or the driver IC that drives the optical system of the second imaging device 5.

<1-7-2. Deciding Unit 12>

The deciding unit 12 is a processing unit that decides the alignment information on the basis of the imaging-related information acquired by the acquiring unit 11. As one aspect, the deciding unit 12 decides alignment information used for alignment with the wide-angle YC image by the aligning unit 5C of the second imaging device 5. Such alignment information can be decided from the viewpoint of reducing a processing amount of the alignment with the wide-angle YC image and reducing an amount of transmission from the first imaging device 1 to the second imaging device 5.

As a mere example, the deciding unit 12 decides, the alignment information, at least one of the depth map, an image of the vicinity of focus, edge information, or the YC image, or a combination thereof. For example, the "depth map" refers to a map in which the depth is measured by the phase difference sensor, the image plane phase difference sensor, or both of them. Furthermore, the "image of the vicinity of focus" refers to a partial image in the telephoto YC image, the partial image corresponding to the vicinity of the subject focused by focal length adjustment control. For example, the focal length adjustment control may be automatically performed by an auto focus (AF) function or the like achieved by the phase difference sensor, the image plane phase difference sensor or by both the phase difference sensor and the image plane phase difference sensor. Alternatively, the focal length adjustment control may be manually performed by manual focus (MF). Furthermore, the "edge information" refers to information in which an edge is detected from the telephoto YC image. Furthermore, the "telephoto YC image" refers to a telephoto YC image itself output from the digital signal processing unit 1B. The "depth map", the "image of the vicinity of focus", the "edge information", and the "telephoto YC image" can be changed to the same resolution as a resolution of the wide-angle YC image during the operation of a zoom function in the first imaging device 1 or the second imaging device 5.

<1-7-3. Outputting Unit 13>

The outputting unit 13 is a processing unit that outputs the alignment information decided by the deciding unit 12. As one aspect, the outputting unit 13 transmits the alignment information decided by the deciding unit 12 to the aligning unit 5C of the second imaging device 5.

<1-8. Processing Procedure of Information Processing Apparatus>

Figure 3:
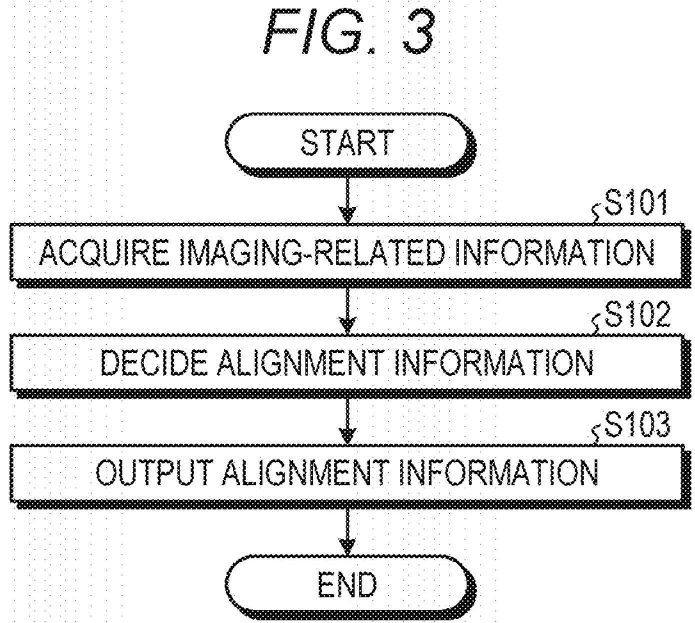
FIG. 3 is a flowchart illustrating a procedure of information output processing according to the first embodiment.

FIG. 3 is a flowchart illustrating a procedure of information output processing according to the first embodiment. As a mere example, this processing can be repeatedly executed for each frame in which the first imaging device 1 and the second imaging device 5 capture images.

As illustrated in FIG. 3, the acquiring unit 11 acquires the imaging-related information related to imaging performed by the first imaging device 1 and the second imaging device 5, for example, a) to f) described above, and the like (step S101).

Subsequently, the deciding unit 12 decides the alignment information to be used for the alignment with the wide-angle YC image by the aligning unit 5C of the second imaging device 5 on the basis of the imaging-related information acquired in step S101 (step S102).

Then, the outputting unit 13 transmits the alignment information decided in step S102 to the aligning unit 5C of the second imaging device 5 (step S103) and ends the processing.

<1-9. One Aspect of Effects>

As described above, the information processing apparatus 10 according to the first embodiment decides and outputs the alignment information to be used for alignment of images between the first imaging device 1 and the second imaging device 5 on the basis of the imaging-related information related to imaging performed by the first imaging device 1.

That is, the information processing apparatus 10 according to the first embodiment outputs the alignment information that can contribute to a reduction in the processing amount and improvement of accuracy in performing the alignment with the wide-angle YC image captured by the second imaging device 5 from the viewpoint unique to imaging in the first imaging device 1.

Therefore, in the information processing apparatus 10 according to the first embodiment, since the alignment of the telephoto YC image and the wide-angle YC image can be speeded up, the real-time property of display of the wide-angle image with the telephoto frame mark can be improved.

2. Second Embodiment

In an embodiment of the present disclosure, there will be described an example of an algorithm that select, as the alignment information described above, one or more of the following: a "depth map", an "image of the vicinity of focus", "edge information", and a "telephoto YC image".

<2-1. Functional Configuration Example of Information Processing Apparatus 20>

Figure 4:
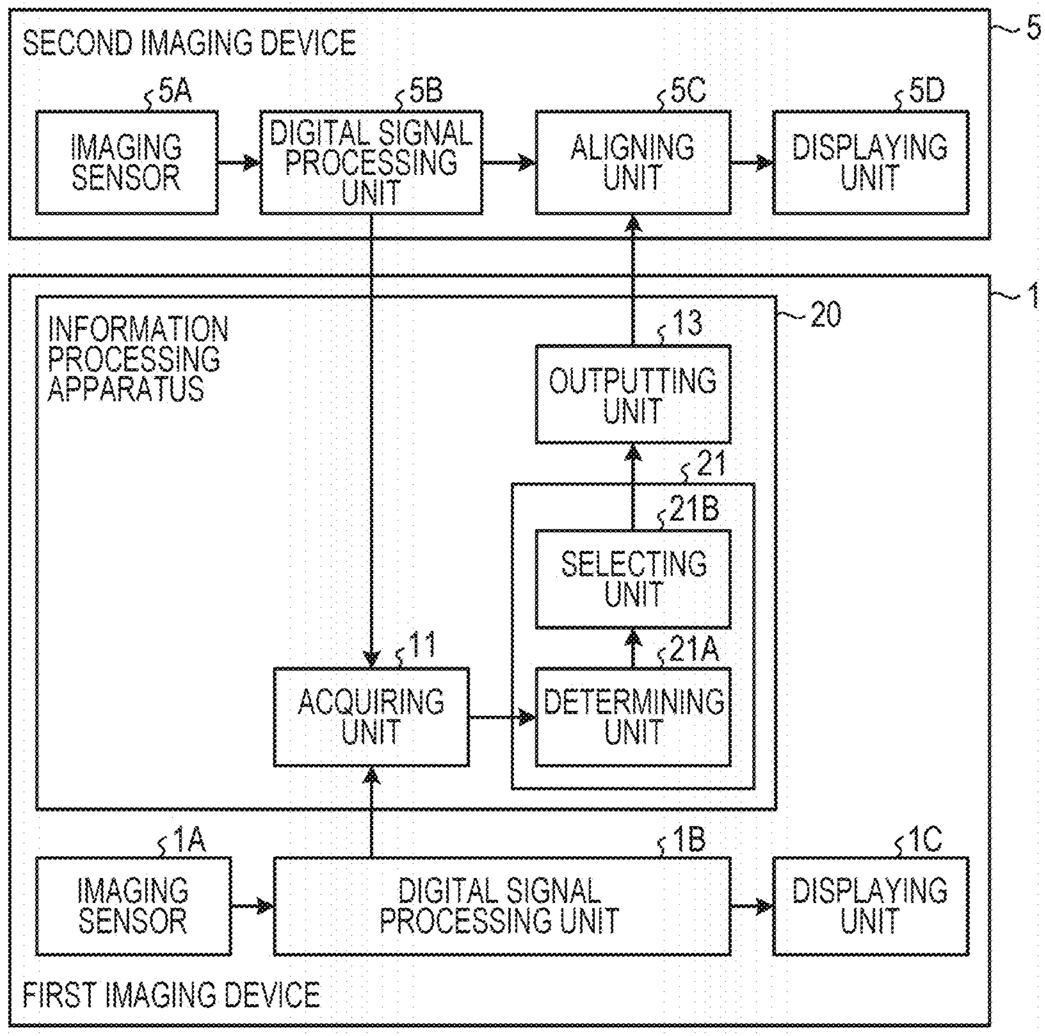
FIG. 4 is a block diagram illustrating a functional configuration example of an information processing apparatus according to a second embodiment.

FIG. 4 is a block diagram illustrating a functional configuration example of an information processing apparatus 20 according to a second embodiment. As illustrated in FIG. 4, the information processing apparatus 20 is different in that the information processing apparatus 20 includes a deciding unit 21 having processing contents partially different from processing contents of the deciding unit 12 of the information processing apparatus 10 illustrated in FIG. 2.

<2-2. Deciding Unit 21>

The deciding unit 21 illustrated in FIG. 4 is different from the deciding unit 12 illustrated in FIG. 2 in that the deciding unit 21 includes a determining unit 21A and a selecting unit 21B.

<2-2-1. Determining Unit 21A>

The determining unit 21A is a processing unit that determines whether or not imaging-related information acquired by an acquiring unit 11 satisfies a predetermined condition.

As an embodiment, the determining unit 21A acquires depth distribution information regarding a subject detected from a telephoto YC image acquired from a digital signal processing unit 1B. The "subject" mentioned here may be a subject focused by an AF function or an MF function, a subject tracked by the AF function, or a subject obtained as a result of object detection. Then, the determining unit 21A determines the presence or absence of unevenness of the subject on the basis of the depth distribution information regarding the subject in the telephoto YC image. As a mere example, the determining unit 21A determines, as a condition 1, whether or not the subject has unevenness on the basis of whether or not a proportion of pixels within a predetermined depth range Th2 to the total number of pixels of the subject is within a predetermined threshold Th1. Such a "depth range Th2" can be set on the basis of a peak in the depth distribution of the subject. For example, certain ranges before and after the peak in the depth distribution can be set as the depth range Th2. At this time, a range included in the depth range Th2 before the peak and a range included in the depth range Th2 after the peak can be changed without necessarily being made the same.

Figure 5:
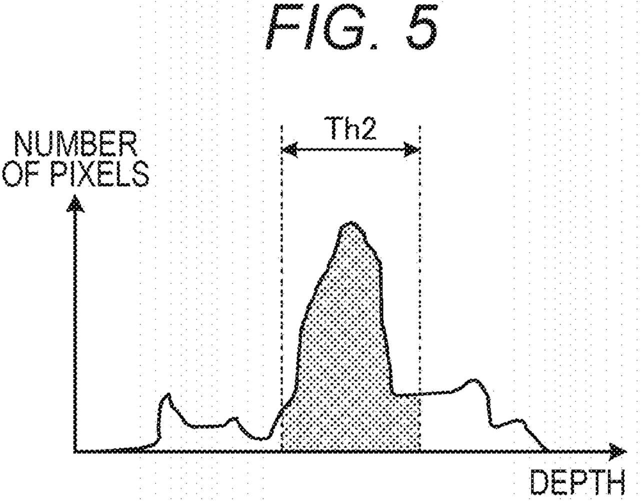
FIG. 5 is a graph illustrating an example of depth distribution information.

FIG. 5 is a graph illustrating an example of the depth distribution information. The vertical axis of the graph illustrated in FIG. 5 indicates the number of pixels, and the horizontal axis indicates depth. The vertical axis and the horizontal axis may be histograms representing the frequency and grade of the depth. In FIG. 5, while a portion corresponding to the total number of pixels of the subject is indicated by painting out in white, a portion corresponding to the depth range Th2 is indicated by hatching. In an example illustrated in FIG. 5, the presence or absence of unevenness of the subject can be identified on the basis of whether or not the number of pixels included in the depth range Th2, that is, the proportion of the number of pixels of a hatched portion to the total number of pixels of the subject, for example, in terms of a probability, a percentage, or the like is within the predetermined threshold Th1, for example, 50%. For example, in a case where the proportion is within the threshold Th1 described above, it is identified that the subject has unevenness, while in a case where the proportion exceeds the threshold Th1 described above, it is identified that the subject does not have unevenness.

Then, in a case where the condition 1 described above is satisfied, that is, in a case where the proportion of the number of pixels in the depth range Th2 to the total number of pixels of the subject is within the threshold Th1, the determining unit 21A determines a condition 2 described below. For example, the determining unit 21A determines, as the condition 2, whether or not the number of pixels whose blur amount exceeds a predetermined threshold Th3 in a region other than the vicinity of focus focused by the AF function or the MF function in the telephoto YC image is within a predetermined threshold Th4. At this time, in a case where the number of pixels whose blur amount exceeds the threshold Th3 is within threshold Th4 in the region other than the vicinity of focus, it is determined that the condition 2 described above is satisfied.

Furthermore, in a case where either the condition 1 described above or the condition 2 described above is not satisfied, the determining unit 21A determines a condition 3 described below and a condition 4 described below. For example, the determining unit 21A determines, as the condition 3, whether or not a transmission band between the first imaging device 1 and the second imaging device 5 is equal to or more than a predetermined threshold Th5. Moreover, in a case where the condition 3 described above is satisfied, that is, in a case where the transmission band is equal to or more than the predetermined threshold Th5, the determining unit 21A determines, as the condition 4, whether or not the processing capability of the second imaging device 5, for example, a performance value such as a clock frequency or the number of cores of a processor is equal to or more than a predetermined threshold Th6.

<2-2-2. Selecting Unit 21B>

The selecting unit 21B is a processing unit that selects one or more of the "depth map", the "image of the vicinity of focus", the "edge information", and the "telephoto YC image" as the alignment information on the basis of a determination result of the determining unit 21A.

As one aspect, in a case where the condition 1 described above and the condition 2 described above are satisfied, the selecting unit 21B selects the depth map as the alignment information. Such conditional branching corresponds to a case where the proportion of the number of pixels in the depth range Th2 to the total number of pixels of the subject is within the threshold Th1, and the number of pixels whose blur amount exceeds the threshold Th3 in the region other than the vicinity of focus is within the threshold Th4.

There are the following aspects as to why such selection of the alignment information is performed. That is, a reason is that in a case where the condition 1 described above is satisfied, there is a high possibility that sufficient accuracy of alignment can be obtained by performing alignment between a telephoto depth map and a wide-angle depth map without performing alignment between two YC images that are the telephoto YC image and a wide-angle YC image. Moreover, a reason is that although in the second imaging device 5 having a focal length shorter than a focal length of the first imaging device 1, a blur amount tends to be smaller than a bluer amount of the first imaging device 1, in a case where the condition 2 described above is satisfied, it can be identified that there is a high possibility that the degree of deviation between the blur amount of the first imaging device 1 and the blur amount of the second imaging device 5 is enough to withstand alignment between the depth maps. For the above reasons, the depth map is selected as the alignment information. By selecting the depth map as the alignment information in this manner, a processing amount can be reduced as compared with a case where the aligning unit 5C is caused to execute alignment between images. Moreover, since the depth map has a smaller amount of information than the telephoto YC image and the edge information, a delay in transmission from the first imaging device 1 to the second imaging device 5 can also be suppressed.

As another aspect, in a case where the condition 1 described above is satisfied, but the condition 2 described above is not satisfied, the selecting unit 21B selects the image of the vicinity of focus as the alignment information. Such conditional branching corresponds to a case where the proportion of the number of pixels in the depth range Th2 to the total number of pixels of the subject is within the threshold Th1, and the number of pixels whose blur amount exceeds the threshold Th3 in the region other than the vicinity of focus is not within the threshold Th4.

The reason why such selection of the alignment information is performed is that there is a high possibility that even in a case where the condition 1 described above is satisfied, if the condition 2 described above is not satisfied, such case falls under the following case. That is, the reason is that it can be identified that there is a high possibility that the degree of deviation between the blur amount of the first imaging device 1 and the blur amount of the second imaging device 5 exceeds a limit that can withstand the alignment between the depth maps. For the above reason, the image of the vicinity of focus described above is selected as the alignment information. By selecting the image of the vicinity of focus as the alignment information in this manner, even a blurred region other than the vicinity of focus is used for alignment by the aligning unit 5C, whereby it is possible to suppress a decrease in the accuracy of the alignment.

Moreover, since the image of the vicinity of focus is a part of the telephoto YC image, the processing amount of the alignment can be reduced as compared with a case where the entire telephoto YC image is used for the alignment. In addition, since the image of the vicinity of focus has a smaller information amount than the telephoto YC image, a delay in transmission from the first imaging device 1 to the second imaging device 5 can also be suppressed.

As a further aspect, in a case where the condition 3 described above and the condition 4 described above are satisfied, the selecting unit 21B selects the telephoto YC image and a depth to the subject as the alignment information. Such conditional branching corresponds to a case where the transmission band between the first imaging device 1 and the second imaging device 5 is equal to or more than the threshold Th5 and the processing capability of the second imaging device 5 is equal to or more than the threshold Th6.

There are the following aspects as to why such selection of the alignment information is performed. That is, a reason is that in a case where both of the condition 3 described above and the condition 4 described above are satisfied, there is a high possibility that a transmission delay does not easily occur even if the telephoto YC image is transmitted from the first imaging device 1 to the second imaging device 5 and a processing delay does not easily occur even if the aligning unit 5C is caused to align the telephoto YC image and the wide-angle YC image. Moreover, the depth to the subject is included in the alignment information, whereby it is possible to cause the aligning unit 5C to narrow a region where alignment with the wide-angle YC image is executed to a region corresponding to the vicinity of the depth, or it is possible to make the weight of a region corresponding to the vicinity of the depth larger than the weights of regions corresponding to depths other than the depth and then cause the aligning unit 5C to execute the alignment with the wide-angle YC image.

As another aspect, in a case where the condition 3 described above or the condition 4 described above is not satisfied, the selecting unit 21B selects the edge information and the depth to the subject as the alignment information. Such conditional branching corresponds to a case where the transmission band between the first imaging device 1 and the second imaging device 5 is not equal to or more than the threshold Th5 or the processing capability of the second imaging device 5 is not equal to or more than the threshold Th6.

There are the following aspects as to why such selection of the alignment information is performed. That is, a reason is that in a case where either the condition 3 described above or the condition 4 described above is not satisfied, there is a high possibility that a transmission delay occurs in a case where the telephoto YC image is transmitted from the first imaging device 1 to the second imaging device 5 or a processing delay occurs in a case where the aligning unit 5C is caused to align the telephoto YC image and the wide-angle YC image. In this case, by selecting the edge information as the alignment information, the processing amount can be reduced as compared with a case where the aligning unit 5C is caused to execute the alignment between images. Moreover, since the edge information has a smaller information amount than the telephoto YC image, a delay in transmission from the first imaging device 1 to the second imaging device 5 can also be suppressed. Moreover, the depth to the subject is included in the alignment information, whereby it is possible to cause the aligning unit 5C to narrow a region where alignment with wide-angle edge information is executed to a region corresponding to the vicinity of the depth, or it is possible to make the weight of a region corresponding to the vicinity of the depth larger than the weights of regions corresponding to depths other than the depth and then cause the aligning unit 5C to execute the alignment with the wide-angle edge information.

Note that in a case where the image of the vicinity of focus is selected as the alignment information, the following branching can be provided in the selection of the alignment information on the basis of whether or not the condition 3 described above and the condition 4 described above are satisfied. For example, when the condition 3 described above and the condition 4 described above are satisfied, the YC image of the vicinity of focus and the depth to the subject are selected, while when the condition 3 described above or the condition 4 described above is not satisfied, the edge information of the vicinity of focus and the depth to the subject can be selected. Furthermore, in a case where other than the depth map is selected as the alignment information, for example, in a case where the image of the vicinity of focus, the edge information, or the YC image is selected, the case falls under a case where the subject has less unevenness. In this case, the depth information having a smaller information amount than the depth map, for example, the depth to the subject can be further selected as the alignment information.

<2-3. Processing Procedure of Information Processing Apparatus 20>

Figure 6:
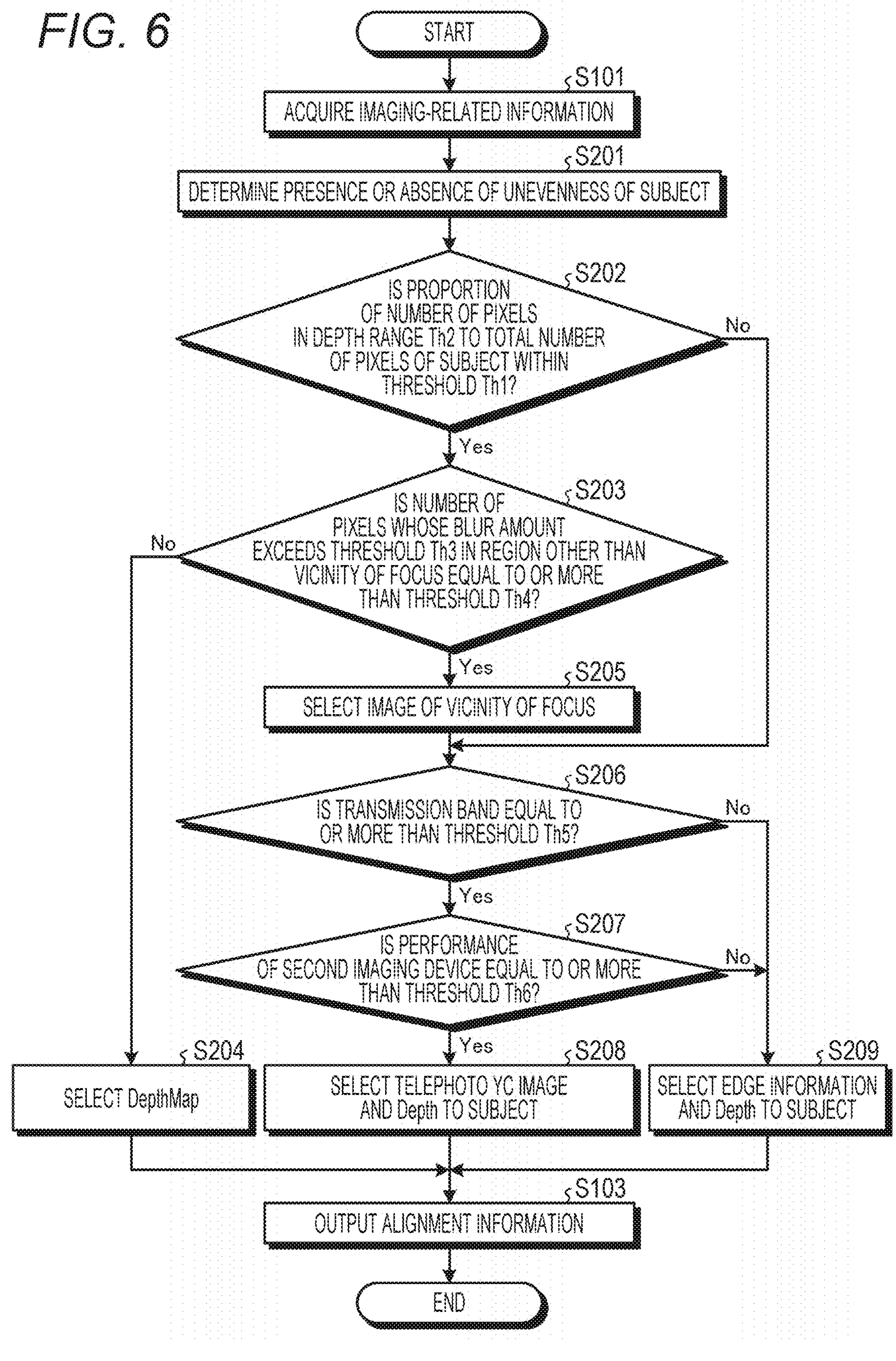
FIG. 6 is a flowchart illustrating a procedure of information output processing according to the second embodiment.

FIG. 6 is a flowchart illustrating a procedure of information output processing according to the second embodiment. As a mere example, this processing can be repeatedly executed for each frame in which the first imaging device 1 and the second imaging device 5 capture images.

As illustrated in FIG. 6, the acquiring unit 11 acquires imaging-related information related to imaging performed by the first imaging device 1 and the second imaging device 5, for example, a) to f) described above, and the like (step S101).

Subsequently, the determining unit 21A determines, as the condition 1, whether or not the subject has unevenness on the basis of the depth distribution information regarding the subject detected from the telephoto YC image included in the imaging-related information acquired in step S101. For example, the determining unit 21A determines, as the condition 1, whether or not the proportion of the number of pixels in the predetermined depth range Th2 to the total number of pixels of the subject is within the predetermined threshold Th1 (step S201).

At this time, in a case where the condition 1 described above is satisfied, that is, in a case where the proportion of the number of pixels in the depth range Th2 to the total number of pixels of the subject is within the threshold Th1 (Yes in step S202), the determining unit 21A determines the condition 2 described below. That is, the determining unit 21A determines, as the condition 2, whether or not the number of pixels whose blur amount exceeds the predetermined threshold Th3 in the region other than the vicinity of focus focused by the AF function or the MF function in the telephoto YC image is within the predetermined threshold Th4 (step S203).

Here, in a case where the condition 2 described above is satisfied, that is, in a case where the number of pixels whose blur amount exceeds the threshold Th3 in the region other than the vicinity of focus is within the threshold Th4 (No in step S203), the selecting unit 21B selects the depth map as the alignment information (step S204). Meanwhile, in a case where the condition 2 described above is not satisfied, that is, in a case where the number of pixels whose blur amount exceeds the threshold Th3 is not within the threshold Th4 in the region other than the region near the focus (Yes in step S203), the selecting unit 21B selects the image of the vicinity of focus as the alignment information (step S205).

Furthermore, in a case where either the condition 1 described above or the condition 2 described above is not satisfied (No in step S202 or No in step S203), the determining unit 21A determines, as the condition 3, whether or not the transmission band between the first imaging device 1 and the second imaging device 5 is equal to or more than the predetermined threshold Th5 (step S206).

Moreover, in a case where the condition 3 described above device is satisfied, that is, in a case where the transmission band is equal to or more than the predetermined threshold Th5 (Yes in step S206), the determining unit 21A determines, as the condition 4, whether or not the processing capability of the second imaging device 5, for example, performance value such as a clock frequency or the number of cores of the processor is equal to or more than the predetermined threshold Th6 (step S207).

At this time, in a case where the condition 4 described above is further satisfied, that is, in a case where the processing capability of the second imaging device 5 is equal to or more than the threshold Th6 (Yes in step S207), the selecting unit 21B selects the telephoto YC image and the depth to the subject as the alignment information (step S208). Meanwhile, in a case where either the condition 3 described above or the condition 4 described above is not satisfied (No in step S206 or No in step S207), the selecting unit 21B selects the edge information and the depth to the subject as the alignment information (step S209).

Here, in a case where the image of the vicinity of focus is selected as the alignment information in step S205, the following branching can be provided in the selection of the alignment information on the basis of whether or not the condition 3 described above and the condition 4 described above are satisfied. For example, when the condition 3 described above and the condition 4 described above are satisfied, the YC image of the vicinity of focus and the depth to the subject are selected, while when the condition 3 described above or the condition 4 described above is not satisfied, the edge information of the vicinity of focus and the depth to the subject can be selected.

Thereafter, the outputting unit 13 transmits the alignment information selected in step S204, step S208, or step S209 to the aligning unit 5C of the second imaging device 5 (step S103) and ends the processing.

<2-4. One Aspect of Effects>

As described above, the information processing apparatus 20 according to the second embodiment selects one or more of the depth map, the image of the vicinity of focus, the edge information, and the telephoto YC image as the alignment information according to the presence or absence of unevenness of the subject, an amount of the region having a large blur amount, an amount of the transmission band, and an amount of the processing capability of the second imaging device 5. Therefore, it is possible to select the alignment information suitable for the situation of imaging by the first imaging device 1. Therefore, with the information processing apparatus 20 according to the second embodiment, it is possible to achieve alignment that achieves a balance between a reduction in the processing amount and the maintenance of accuracy.

3. Third Embodiment

In an embodiment of the present disclosure, there will be described an example in which a telephoto YC image having the same resolution as a resolution of a wide-angle YC image is generated as alignment information during the operation of a zoom function in a first imaging device 1 or a second imaging device 5.

Hereinafter, as a mere example, there will be described an example in which an example of an image is output from the first imaging device 1 to the second imaging device 5 is a telephoto YC image.

<3-1. Functional Configuration Example of Information Processing Apparatus 30>

Figure 7:
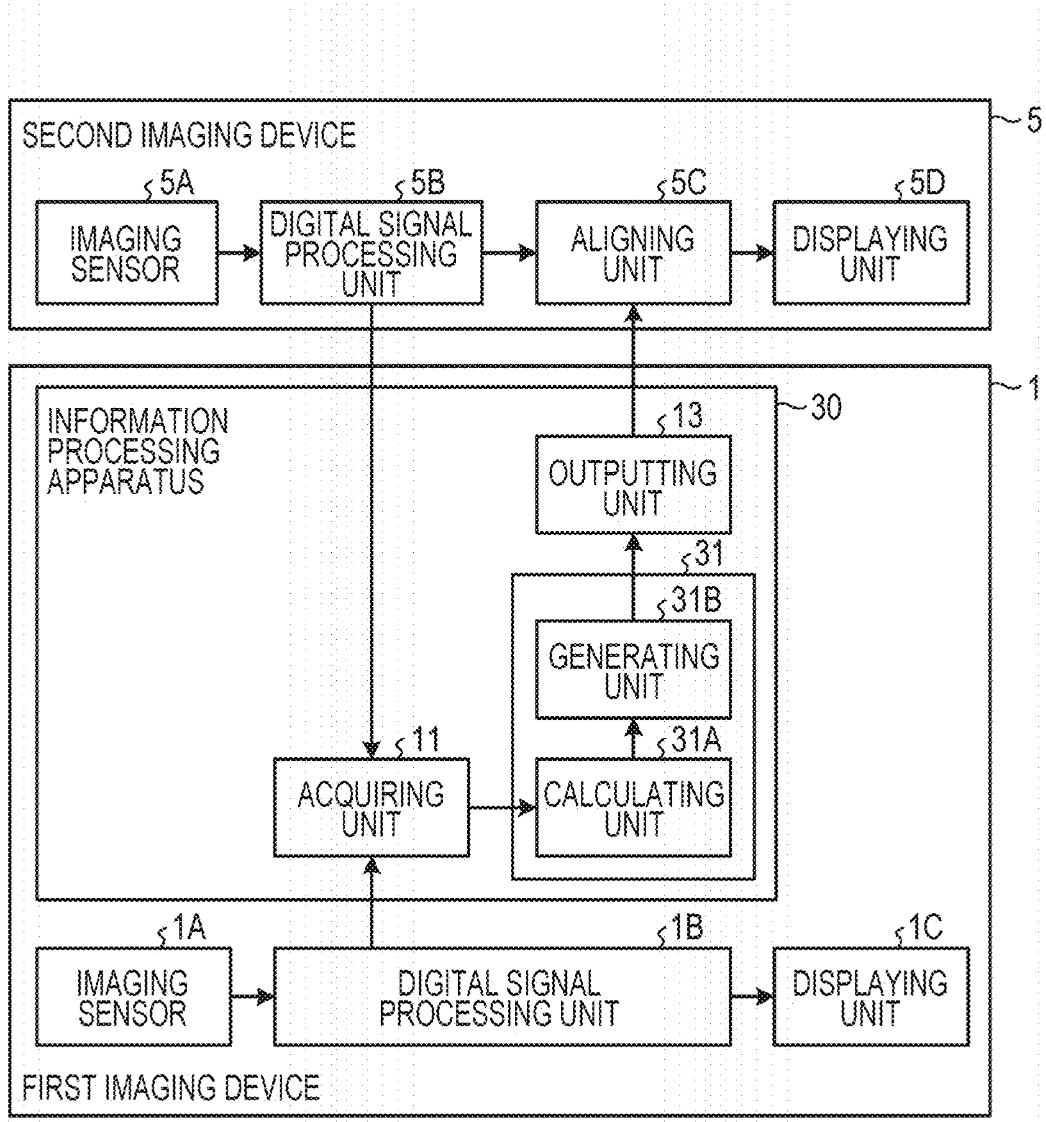
FIG. 7 is a block diagram illustrating a functional configuration example of an information processing apparatus according to a third embodiment.

FIG. 7 is a block diagram illustrating a functional configuration example of an information processing apparatus 30 according to a third embodiment. As illustrated in FIG. 7, the information processing apparatus 30 is different in that the information processing apparatus 30 includes a deciding unit 31 having processing contents partially different from processing contents of the deciding unit 12 of the information processing apparatus 10 illustrated in FIG. 2.

<3-2. Deciding Unit 31>

The deciding unit 31 illustrated in FIG. 7 is different from the deciding unit 12 illustrated in FIG. 2 in that the deciding unit 31 includes a calculating unit 31A and a generating unit 31B.

<3-2-1. Calculating Unit 31A>

The calculating unit 31A is a processing unit that calculates the number of pixels of an imaging sensor 5A of the second imaging device 5 included in an overlapping region where an angle of view at which the second imaging device 5 captures an image and an angle of view at which the first imaging device 1 captures an image overlap each other.

FIG. 8 is a diagram illustrating an example of a correspondence relationship between a focal length and an angle of view. FIG. 8 illustrates, as a mere example, an example in which an optical axis of the first imaging device 1 and an optical axis of a second imaging device 2 coincide with each other. As illustrated in FIG. 8, an angle of view on a wide-angle side is larger than an angle of view on a telephoto side. In this case, the number of pixels of the imaging sensor 5A of the second imaging device 5 included in an overlapping region where the angle of view on the wide-angle side and the angle of view on the telephoto side overlap each other, and a hatched portion in the figure can be calculated on the basis of the aspects of the imaging sensor 1A and the imaging sensor 5A. For example, a horizontal angle of view on the wide-angle side can be calculated according to the following equation (1). Furthermore, a horizontal angle of view on the telephoto side can be calculated according to the following equation (2). From equations (1) and (2), it can be seen that, in a case where either a focal length on the telephoto side or a focal length on the wide-angle side changes, the number of pixels of the imaging sensor 5A included in the overlapping region described above, that is, a resolution of the overlapping region on the wide-angle side changes.

$$\text{Horizontal angle of view on wide-angle side}=2\times\arctan[\text{horizontal width of imaging sensor 5A}/2/\text{focal length on wide-angle side}] \quad (1)$$

$$\text{Horizontal angle of view on telephoto side}=2\times\arctan[\text{horizontal width of imaging sensor 1A}/2/\text{focal length on telephoto side}] \quad (2)$$

From the above, in a case where the zoom function is operating, the calculating unit 31A recalculates the resolution of the overlapping region on the wide-angle side. For example, the calculating unit 31A calculates the resolution of the overlapping region on the wide-angle side on the basis of a focal length on the telephoto side after zooming and a focal length on the wide-angle side after zooming. By narrowing down and executing such calculation of the resolution during the operation of the zoom function, it is possible to omit processing in a situation where there is no change in zoom.

<3-2-2. Generating Unit 31B>

The generating unit 31B generates, as the alignment information, a telephoto YC image having a resolution that matches the resolution of the overlapping region on the wide-angle side, the resolution having been calculated by the calculating unit 31A. As a mere example, in a case where the zoom function is operating, the generating unit 31B changes the resolution of the telephoto YC image output from a digital signal processing unit 1B to the resolution that matches the resolution of the overlapping region on the wide-angle side, the resolution having been calculated by the calculating unit 31A. As a result, the telephoto YC image is enlarged or reduced according to a zoom amount.

<3-3. Processing Procedure of Information Processing Apparatus 30>

FIG. 9 is a flowchart illustrating a procedure of information output processing according to the third embodiment. As a mere example, this processing can be repeatedly executed for each frame in which the first imaging device 1 and the second imaging device 5 capture images. Note that FIG. 9 illustrates an excerpt of processing corresponding to step S102, that is, processing executed by the deciding unit 31 in a series of processing illustrated in FIG. 3.

As illustrated in FIG. 9, in a case where the zoom function is operating (Yes in step S301), the calculating unit 31A calculates the resolution of the overlapping region on the wide-angle side on the basis of the focal length on the telephoto side after zooming and the focal length on the wide-angle side after zooming (step S302). Thereafter, the generating unit 31B generates, as the alignment information, a telephoto YC image obtained by changing the resolution of the telephoto YC image output from the digital signal processing unit 1B to the resolution that matches the resolution of the overlapping region on the wide-angle side, the resolution having been calculated in step S302 (step S304).

Meanwhile, in a case where the zoom function is not operating (No in step S301), the number of pixels of the imaging sensor 5A included in the overlapping region described above, that is, the resolution of the overlapping region on the wide-angle side does not change. Therefore, the calculating unit 31A fixes the most recently changed resolution as is (step S303). Then, the generating unit 31B generates, as the alignment information, the telephoto YC image obtained by changing the resolution of the telephoto YC image output from the digital signal processing unit 1B to the resolution that matches the resolution of the overlapping region on the wide-angle side, the resolution having been fixed in step S304 (step S304).

The alignment information generated in this manner in step S304 is output to the aligning unit 5C of the second imaging device 5.

<3-4. One Aspect of Effects>

As described above, the information processing apparatus 30 according to the third embodiment generates, as the alignment information, the telephoto YC image having the resolution that matches the resolution of the overlapping region on the wide-angle side, the resolution having been calculated on the basis of the focal length on the telephoto side after zooming and the focal length on the wide-angle side after zooming. Therefore, even in a case where the zoom function operates, it is possible to cause the aligning unit 5C to execute alignment in a state where scales are matched between the telephoto YC image and the wide-angle YC image. Therefore, with the information processing apparatus 30 according to the third embodiment, it is possible to narrow a search range of a transformation matrix and improve the accuracy of alignment.

<<4. Modifications>>

Hereinafter, modifications of the first to third embodiments will be described.

<4-1. Combination Between Embodiments>

In the second embodiment and the third embodiment, there have been described examples in which both the second embodiment and the third embodiment are implemented individually, but the second embodiment and the third embodiment can be implemented in combination. In this case, the depth map, the image of the vicinity of focus, and the edge information selected as the alignment information in the second embodiment can also be changed to the resolution that matches the resolution of the overlapping region on the wide-angle side. As a mere example, a flowchart illustrated in FIG. 9 can be implemented in step S201 illustrated in FIG. 6. As another example, the flowchart illustrated in FIG. 9 can be implemented in step S204, step S205, step S208, or step S209 illustrated in FIG. 6.

<4-2. Execution Subject of Alignment>

In the first to third embodiments, there have been described examples in which alignment by the aligning unit 5C is performed by the second device 5, but alignment can also be executed by the first imaging device 1. In this case, a position of a frame of a telephoto YC image on a wide-angle YC image is only required to be transmitted from the first imaging device 1 to the second imaging device 5. For example, in the processing of the deciding unit 21 illustrated in FIG. 6, the wide-angle side is replaced with the telephoto side in reading, and the telephoto side is replaced with the wide-angle side in reading, whereby a wide-angle depth map, a wide-angle image of the vicinity of focus, and wide-angle edge information can be transmitted as alignment information. Using such alignment information, the first imaging device 1 performs alignment and transmits the position of the frame of the telephoto YC image on the wide-angle YC image to the second imaging device 5. At this time, by performing edge extraction or extraction of a point in focus from an image acquired by the first imaging device 1 at the time of alignment by the first imaging device 1, alignment can be achieved at a high speed.

<4-3. Other Modifications>

Furthermore, among the respective processing described in the embodiments described above, all or a part of the processing described as being performed automatically can be performed manually, or all or a part of the processing described as being performed manually can be performed automatically by a known method. In addition, the processing procedures, specific names, and information including various data and parameters illustrated in the document and the drawings described above can be optionally changed unless otherwise specified. For example, the various types of information illustrated in each figure are not limited to the illustrated information.

Furthermore, each component of each apparatus and device illustrated in the drawings is functionally conceptual and does not necessarily need to be physically configured as illustrated in the drawings. That is, a specific form of distribution and integration of each apparatus and device is not limited to the illustrated form, and all or a part thereof can be functionally or physically distributed and integrated in any unit according to various loads, usage conditions, and the like.

Furthermore, effects in each embodiment described in the description are merely exemplary and not limited, and there may be other effects.

<<5. Hardware Configuration>>

Figure 10:
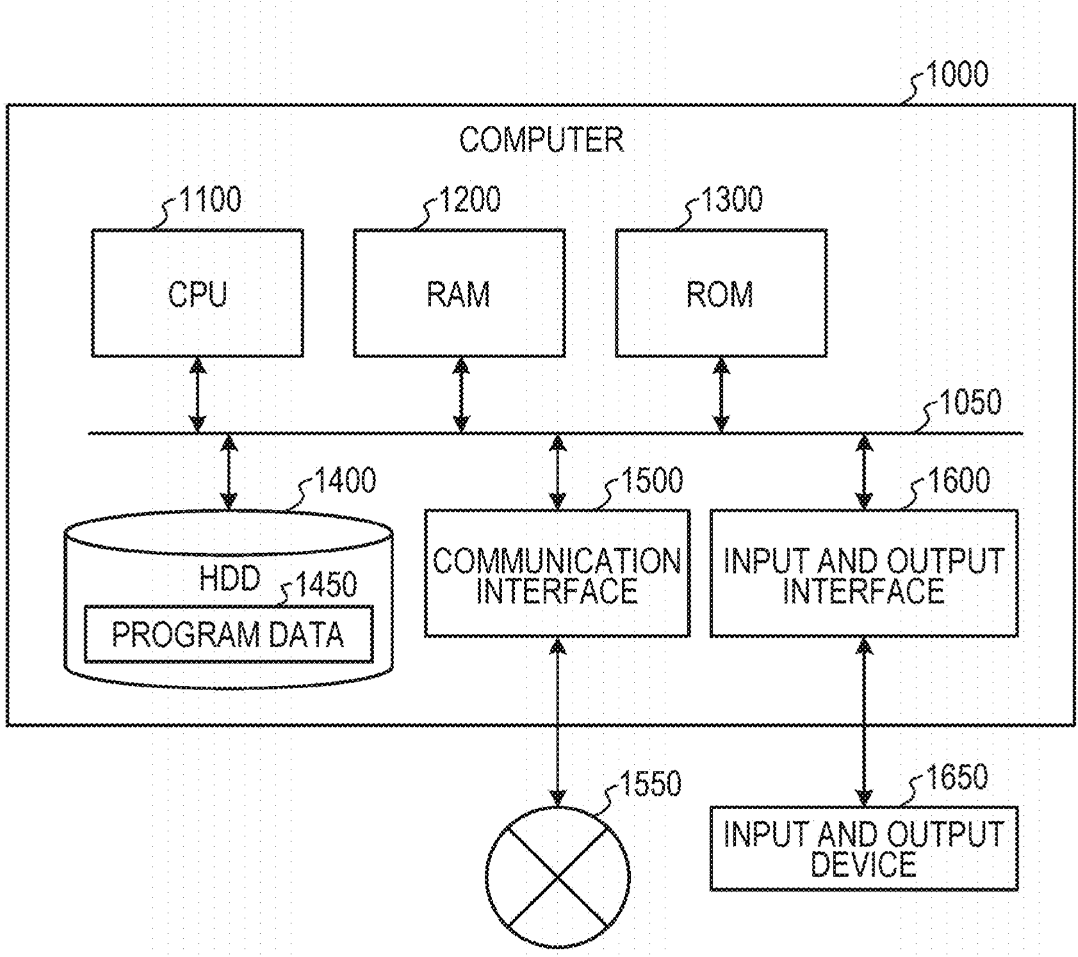
FIG. 10 is a hardware configuration diagram illustrating an example of a computer.

The information processing apparatus 10, 20, or 30 according to each embodiment described above is achieved, for example, by a computer 1000 having a configuration as illustrated in FIG. 10. Hereinafter, the information processing apparatus 10, 20, or 30 according to the embodiment described above will be exemplified and described. FIG. 10 is a hardware configuration diagram illustrating an example of the computer 1000. The computer 1000 includes a CPU 1100, a RAM 1200, a read only memory (ROM) 1300, a hard disk drive (HDD) 1400, a communication interface 1500, and an input and output interface 1600. Each unit of the computer 1000 is connected by a bus 1050.

The CPU 1100 operates on the basis of a program stored in the ROM 1300 or the HDD 1400 and controls each unit. For example, the CPU 1100 develops a program stored in the ROM 1300 or the HDD 1400 in the RAM 1200 and executes processing corresponding to various programs.

The ROM 1300 stores a boot program such as a basic input output system (BIOS) executed by the CPU 1100 when the computer 1000 is started, a program depending on hardware of the computer 1000, and the like.

The HDD 1400 is a computer-readable recording medium that non-transiently records a program to be executed by the CPU 1100, data to be used by the program, and the like. Specifically, the HDD 1400 is a recording medium that records an information processing program according to the present disclosure, the information processing program being an example of program data 1450.

The communication interface 1500 is an interface for the computer 1000 to connect to an external network 1550 (for example, the Internet). For example, the CPU 1100 receives data from another device or transmits data generated by the CPU 1100 to another device via the communication interface 1500.

An input and output interface 1600 is an interface for connecting an input and output device 1650 and the computer 1000. For example, the CPU 1100 receives data from an input device such as a keyboard or a mouse via the input and output interface 1600. Furthermore, the CPU 1100 transmits data to an output device such as a display, a speaker, or a printer via the input and output interface 1600. Furthermore, the input and output interface 1600 may function as a media interface that reads a program or the like recorded in a predetermined recording medium (medium). The medium is, for example, an optical recording medium such as a digital versatile disc (DVD) or a phase change rewritable disk (PD), a magneto-optical recording medium such as a magneto-optical disk (MO), a tape medium, a magnetic recording medium, a semiconductor memory, or the like.

For example, in a case where the computer 1000 functions as the information processing apparatus 10, 20, or 30 according to the embodiment described above, the CPU 1100 of the computer 1000 achieves each functional unit included in a controlling unit 15 by executing the information processing program loaded on the RAM 1200. Furthermore, the HDD 1400 stores the information processing program according to the present disclosure and data in a content storage unit 121. Note that the CPU 1100 reads the program data 1450 from the HDD 1400 and executes the program data 1450, but as another example, these programs may be acquired from another device via the external network 1550.

Note that the present technology can also have the following configurations.

(1) An information processing apparatus including:

a deciding unit configured to decide alignment information to be used for alignment between a first image captured by a first imaging device and a second image captured by a second imaging device having an angle of view wider than an angle of view of the first imaging device, on the basis of imaging-related information related to imaging performed by the first imaging device; and an outputting unit configured to output the alignment information.

(2) The information processing apparatus according to the (1), in which the deciding unit is configured to decide alignment information to be used for alignment with the second image, and the outputting unit is configured to output the alignment information to the second imaging device.

(3) The information processing apparatus according to the (2), in which the deciding unit includes:

a determining unit configured to determine whether or not the imaging-related information satisfies a predetermined condition; and a selecting unit configured to select at least one of a depth map corresponding to the first image, an image of the vicinity of focus corresponding to the vicinity of a subject focused by adjustment control of a predetermined focal length in the first image, edge information detected from the first image, or the first image on the basis of a determination result of the determining unit.

(4) The information processing apparatus according to the (3), in which the determining unit is a determining unit configured to determine presence or absence of unevenness of a subject on the basis of depth distribution information of the subject in the first image, and the selecting unit is configured to select the depth map as the alignment information in a case where the subject has unevenness.

(5) The information processing apparatus according to the (4), in which the determining unit is configured to determine whether or not the subject has unevenness on the basis of whether or not a proportion of pixels within a predetermined depth range to the total number of pixels of the subject is within a predetermined threshold.

(6) The information processing apparatus according to the (3) to the (5), in which the determining unit is configured to determine whether or not the number of pixels whose blur amount exceeds a predetermined threshold is within a predetermined threshold in a region other than the vicinity of focus focused by the adjustment control of the focal length, and the selecting unit is configured to select the image of the vicinity of focus in a case where the number of pixels whose blur amount exceeds the threshold is not within the threshold in the region other than the vicinity of focus.

(7) The information processing apparatus according to the (3) to the (6), in which the determining unit is configured to determine whether or not a transmission band between the first imaging device and the second imaging device is equal to or more than a predetermined threshold, and the selecting unit is configured to select the first image in a case where the transmission band is equal to or more than the threshold and select the edge information in a case where the transmission band is not equal to or more than the threshold.

(8) The information processing apparatus according to the (3) to the (7), in which the determining unit is configured to determine whether or not processing capability of the second imaging device is equal to or more than a predetermined threshold, and the selecting unit is configured to select the first image in a case where the processing capability is equal to or more than the threshold and select the edge information in a case where the processing capability is not equal to or more than the threshold.

(9) The information processing apparatus according to the (3) to the (8), in which the selecting unit is configured to further select a depth to the subject as the alignment information in a case of selecting other than the depth map.

(10) The information processing apparatus according to the (2) to the (9), in which the deciding unit includes:

a calculating unit configured to calculate, as a resolution of an overlapping region where an angle of view of the first imaging device and an angle of view of the second imaging device overlap each other, a number of pixels of an imaging sensor of the second imaging device included in the overlapping region; and a generating unit configured to generate, as the alignment information, a first image obtained by changing a resolution of the first image to a resolution that matches the resolution of the overlapping region.

(11) The information processing apparatus according to the (10), in which the calculating unit is configured to calculate the resolution of the overlapping region in a case where a zoom function is operating in either the first imaging device or the second imaging device.

(12) The information processing apparatus according to the (1), in which the deciding unit is configured to decide alignment information to be used for alignment with the first image, and the outputting unit is configured to output the alignment information to the first imaging device.

(13) An information processing method causing a computer to execute processing of:

deciding alignment information to be used for alignment between a first image captured by a first imaging device and a second image captured by a second imaging device having an angle of view wider than an angle of view of the first imaging device, on the basis of imaging-related information related to imaging performed by the first imaging device; and outputting the alignment information.

(14) An information processing program causing a computer to execute processing of:

deciding alignment information to be used for alignment between a first image captured by a first imaging device and a second image captured by a second imaging device having an angle of view wider than an angle of view of the first imaging device, on the basis of imaging-related information related to imaging performed by the first imaging device; and outputting the alignment information.

REFERENCE SIGNS LIST

1 First imaging device
1A Imaging sensor
1B Digital signal processing unit
1C Displaying unit
5 Second imaging device
5A Imaging sensor
5B Digital signal processing unit
5C Aligning unit
5D Displaying unit
10 Information processing apparatus
11 Acquiring unit
12 Deciding unit
13 Outputting unit

The invention claimed is:

1. An information processing apparatus comprising:

a memory storing program code, and a processor configured to execute the program code to perform operations comprising:

determining alignment information to be used for alignment between a first image captured from a first imaging perspective having a first angle of view and a second image captured from a second imaging perspective having second angle of view that is different from the first angle of view, on a basis of imaging-related information including at least one of focal length or optical axis deviation, wherein the first image is captured through a first lens, and the second image is captured through a second lens, wherein the alignment information includes at least one of a depth map corresponding to the first image, an image of a vicinity of focus in the first image, edge information detected from the first image, or the first image itself, wherein the alignment information is arranged to guide alignment processing of the second image; and outputting the alignment information to process the second image.

2. The information processing apparatus according to claim 1, wherein the first image and second images are captured using one or more image sensors that include a pixel array.

3. The information processing apparatus according to claim 1, wherein the imaging-related information includes focal length.

4. The information processing apparatus according to claim 3, wherein the imaging-related information includes optical axis deviation.

5. The information processing apparatus according to claim 1, wherein the imaging-related information includes optical axis deviation.

6. The information processing apparatus according to claim 1, wherein determining the alignment information comprises selecting the alignment information from among a plurality of candidate data types based on the imaging-related information.

7. The information processing apparatus according to claim 1, wherein the alignment information comprises the depth map, and the alignment processing is guided to emphasize image regions corresponding to a subject depth.

8. The information processing apparatus according to claim 1, wherein the alignment information comprises the image of the vicinity of focus of the first image, and the alignment processing is guided using the image of the vicinity of focus.

9. The information processing apparatus according to claim 1, wherein the alignment information comprises the edge information detected from the first image, and the alignment processing is guided using the edge information.

10. The information processing apparatus of claim 1, wherein outputting the alignment information comprises transmitting the alignment information to a processing pipeline separate from image capture.

11. A non-transitory computer readable medium storing program code for image processing, the program code being executable by at least one processor to perform operations comprising:

determining alignment information to be used for alignment between a first image captured from a first imaging perspective having a first angle of view and a second image captured from a second imaging perspective having second angle of view that is different from the first angle of view, on a basis of imaging-related information including at least one of focal length or optical axis deviation, wherein the first image is captured through a first lens, and the second image is captured through a second lens, wherein the alignment information includes at least one of a depth map corresponding to the first image, an image of a vicinity of focus in the first image, edge information detected from the first image, or the first image itself, wherein the alignment information is arranged to guide alignment processing for the second image; and outputting the alignment information to process the second image.

12. The non-transitory computer readable medium according to claim 8, wherein the first image and second images are captured using one or more image sensors that include a pixel array.

13. The non-transitory computer readable medium according to claim 11, wherein the imaging-related information includes focal length.

14. The non-transitory computer readable medium according to claim 13, wherein the imaging-related information includes optical axis deviation.

15. The non-transitory computer readable medium according to claim 11, wherein the imaging-related information includes optical axis deviation.

16. The non-transitory computer readable medium according to claim 11, wherein determining the alignment information comprises selecting the alignment information from among a plurality of candidate data types based on the imaging-related information.

17. The non-transitory computer readable medium according to claim 11, wherein the alignment information comprises the depth map, and the alignment processing is guided to emphasize image regions corresponding to a subject depth.

18. The non-transitory computer readable medium according to claim 11, wherein the alignment information comprises the image of the vicinity of focus of the first image, and the alignment processing is guided using the image of the vicinity of focus.

19. The non-transitory computer readable medium of claim 11, wherein outputting the alignment information comprises transmitting the alignment information to a processing pipeline separate from image capture.

* * * * *